US012791050B2

(12) United States Patent
Huang et al.

(10) Patent No.: US 12,791,050 B2
(45) Date of Patent: Nov. 10, 2026

(54) FASTENER AND FASTENER CONNECTING ASSEMBLY COMPRISING SAME

(71) Applicant: Illinois Tool Works Inc., Glenview, IL (US)

(72) Inventors: Liang Huang, Shanghai (CN); Xing Wang, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 87 days.

(21) Appl. No.: 18/224,931

(22) Filed: Jul. 21, 2023

(65) Prior Publication Data

US 2024/0035503 A1 Feb. 1, 2024

(30) Foreign Application Priority Data

Jul. 29, 2022 (CN) ......................... 202210905136.1

(51) Int. Cl.
*F16B 5/12* (2006.01)
*F16B 5/06* (2006.01)

(52) U.S. Cl.
CPC ............ *F16B 5/123* (2013.01); *F16B 5/0607* (2013.01)

(58) Field of Classification Search
CPC .................... F16B 5/123; F16B 5/0607; F16B 2005/0671; F16B 21/02; F16B 21/086; F16B 21/04; B60R 13/0206
See application file for complete search history.

(56) References Cited

U.S. PATENT DOCUMENTS

| | | | | |
|---|---|---|---|---|
| 4,262,394 A * | 4/1981 | Wright | F16B 21/02 | 411/908 |
| 4,657,462 A * | 4/1987 | Hoen | F16B 21/02 | 24/DIG. 59 |
| 4,762,437 A * | 8/1988 | Mitomi | F16B 21/086 | 24/297 |
| 5,142,834 A * | 9/1992 | Laclave | F16B 5/10 | 24/453 |
| 5,368,427 A * | 11/1994 | Pfaffinger | F16B 21/04 | 24/DIG. 54 |
| 6,237,970 B1 * | 5/2001 | Joannou | F16B 21/09 | 292/241 |
| 7,955,038 B2 * | 6/2011 | Silbereisen | F16B 21/02 | 24/663 |

(Continued)

*Primary Examiner* — Jason W San
*Assistant Examiner* — Rowland Do
(74) *Attorney, Agent, or Firm* — McAndrews, Held & Malloy, Ltd.

(57) ABSTRACT

The present disclosure relates to a fastener for fastening a fastening attachment to a carrier. The fastener includes a support disc and an engaging mechanism. The lower side of the support disc has a support disc supporting surface. The engaging mechanism connects the fastening attachment, and the engaging mechanism is formed by extending from the support disc supporting surface. The engaging mechanism includes a rod, a head and a pair of deflectable support members. A proximal end of the rod is connected to the support disc supporting surface. The head is arranged at a distal end of the rod. The pair of deflectable support members are arranged on the rod and comprise support member supporting surfaces facing the support disc, and a pre-assembling clamping space is defined between the support member supporting surfaces and the support disc to clamp at least part of a thickness of the fastening attachment.

18 Claims, 11 Drawing Sheets

(56) References Cited

U.S. PATENT DOCUMENTS

| | | | | |
|---|---|---|---|---|
| 9,186,703 | B2 * | 11/2015 | Lane | B07B 1/4645 |
| 9,200,660 | B2 * | 12/2015 | Tisol, Jr. | F16B 21/02 |
| 10,933,817 | B2 * | 3/2021 | Leverger | B60J 5/0468 |
| 2004/0170491 | A1 * | 9/2004 | Hulin | F16B 21/09 411/553 |
| 2007/0172336 | A1 * | 7/2007 | Hsu | F16B 5/065 411/508 |
| 2010/0272540 | A1 * | 10/2010 | Bucker | F16B 21/086 411/549 |
| 2011/0262243 | A1 * | 10/2011 | Glickman | F16B 21/02 411/347 |
| 2012/0073089 | A1 * | 3/2012 | Buillas | B60R 13/0206 24/293 |
| 2015/0089778 | A1 * | 4/2015 | Tisol, Jr. | F16B 21/02 24/663 |
| 2016/0040705 | A1 * | 2/2016 | Peter | F16B 21/02 403/348 |
| 2018/0056893 | A1 * | 3/2018 | Bumgarner | F16B 21/086 |
| 2019/0118731 | A1 * | 4/2019 | Leverger | B60J 5/0486 |
| 2020/0132101 | A1 * | 4/2020 | Zander | F16B 5/10 |

* cited by examiner

FASTENER AND FASTENER CONNECTING ASSEMBLY COMPRISING SAME

RELATED APPLICATION

The present application claims the benefit of Chinese Patent Application No. 2022109051361, filed Jul. 29, 2022 titled "Fastener And Fastener Connecting Assembly Comprising Same," the contents of which are hereby incorporated by reference.

TECHNICAL FIELD

The present disclosure relates to a fastener and a fastener connecting assembly comprising the fastener, and in particular to a fastener for a vehicle and a fastener connecting assembly comprising the fastener.

BACKGROUND

During assembly of vehicles, it is required to connect two components, for example, to connect a vehicle body trim panel and a frame of a vehicle. Fasteners are usually used to connect the components.

SUMMARY

The present disclosure relates generally to a fastener and a fastener connecting assembly, substantially as illustrated by and described in connection with at least one of the figures, as set forth more completely in the claims. The present disclosure provides a fastener and a fastener connecting assembly obtained by using the fastener to connect a fastening attachment. The fastener and the fastener connecting assembly of the present disclosure are simple in structure and easy to manufacture. The fastener of the present disclosure could be easily inserted into the fastening attachment, and the fastener can firmly held in a pre-assembling position relative to the fastening attachment. The fastener of the present disclosure can firmly fasten the fastening attachment to a carrier. Also, along the insertion direction, the fastener of the present disclosure has a same position in the pre-assembling position and a fastening position relative to the fastening attachment so that the fastener of the present disclosure can conveniently connect the fastening attachment and the carrier.

DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

4*b* in a direction.

Figure 4A:
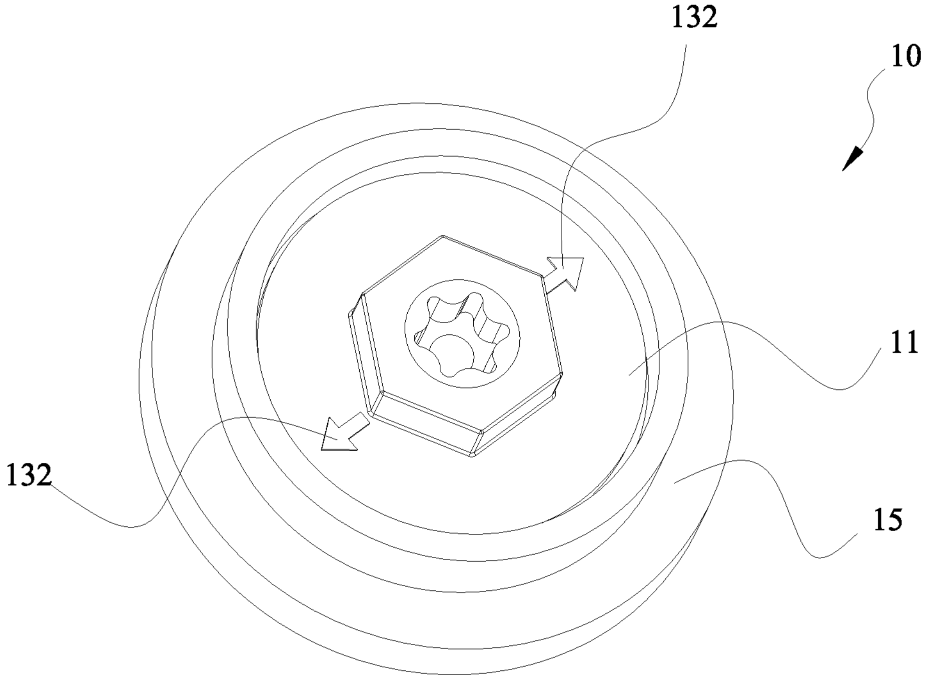
FIG. 4*a* is a perspective view at an angle of a fastener connecting assembly, which is formed by connecting the fastener of FIG. 1*a* and the fastening attachment of FIG. 3*a*.
Figure 4B:
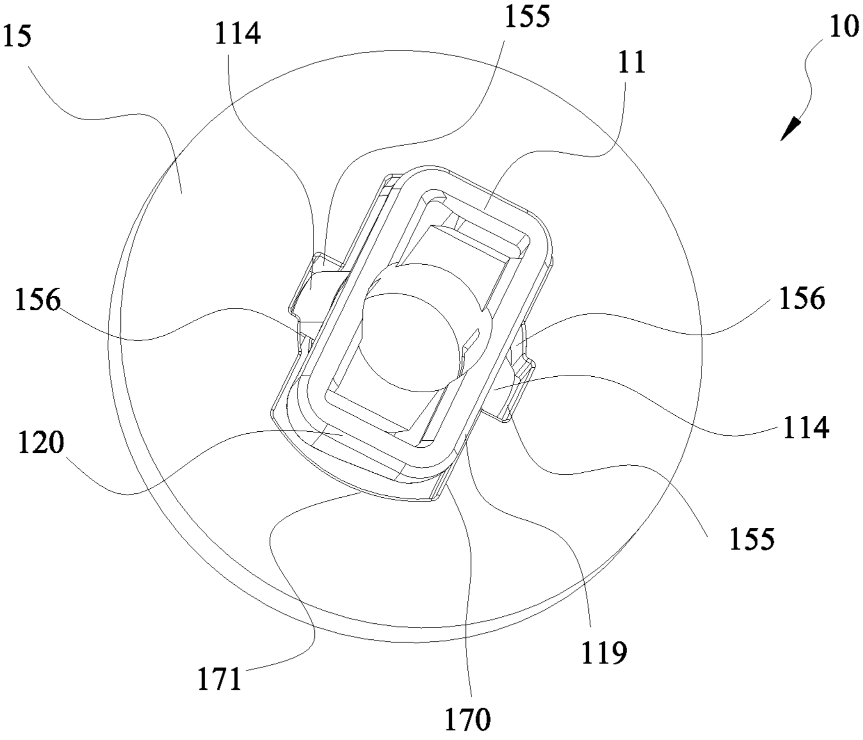
FIG. 4*b* is a perspective view at another angle of the fastener connecting assembly in FIG. 4*a*.
Figure 5A:
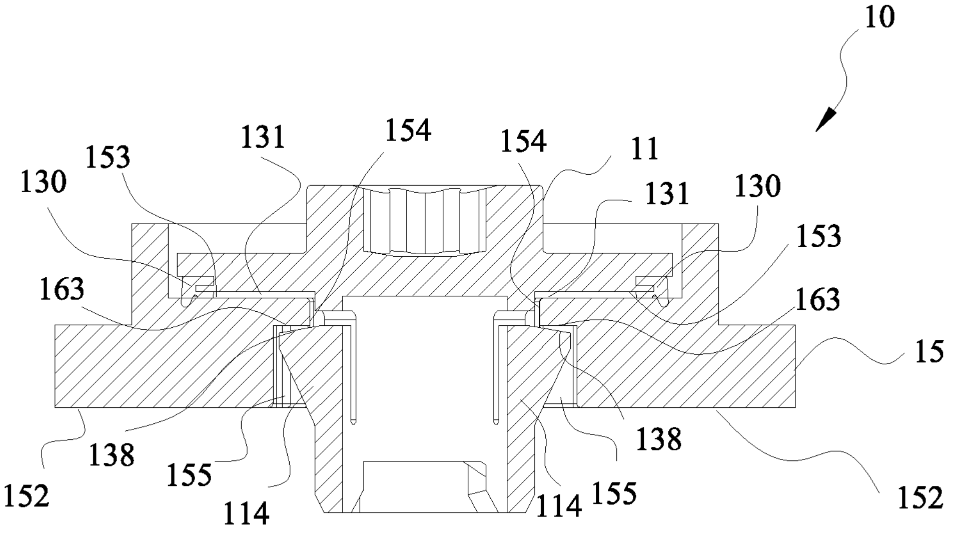
FIG. 5*a* is a sectional view of the fastener connecting assembly in FIGS. 4*a*.
Figure 5B:
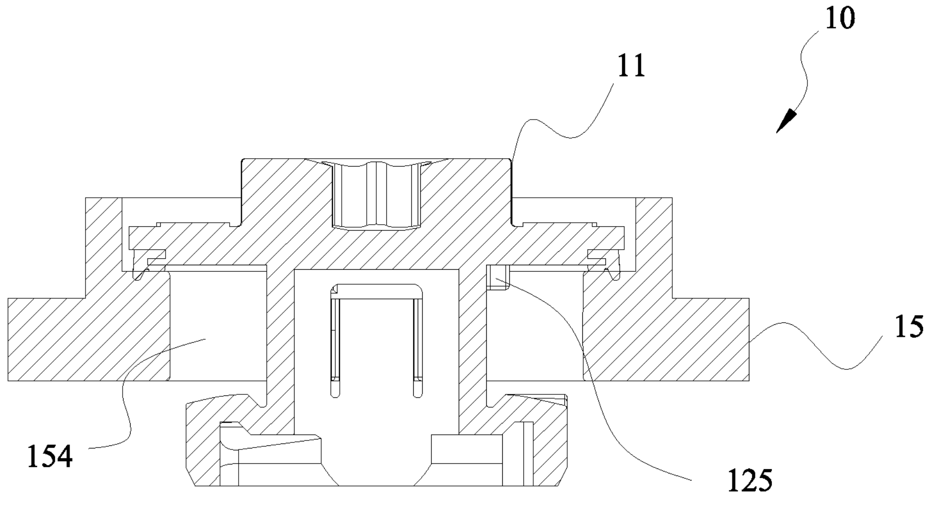

FIG. 5*b* is a sectional view of the fastener connecting assembly in FIGS. 4*a* and 4*b* in another direction.

Figure 6:
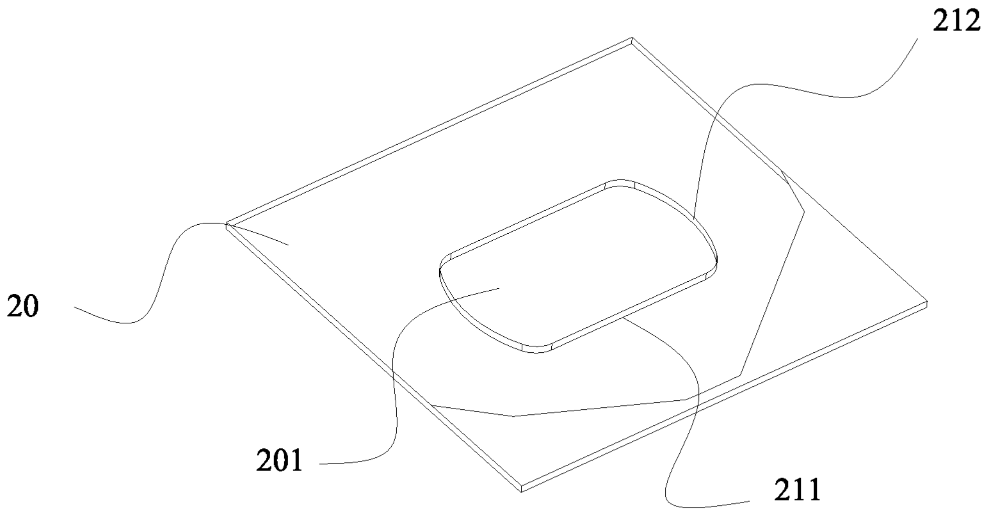

FIG. 6 is a perspective view of a carrier.

Figure 7A:
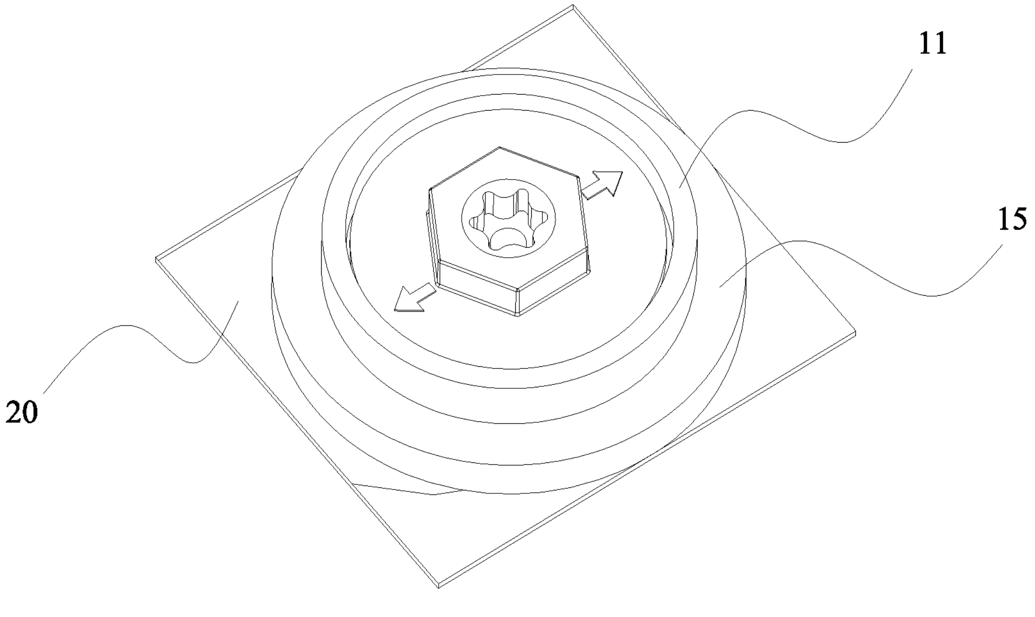

FIG. 7*a* is a perspective view at an angle of the fastener connecting assembly in FIG. 4*a* inserted into but not fastened to the carrier.

Figure 7B:
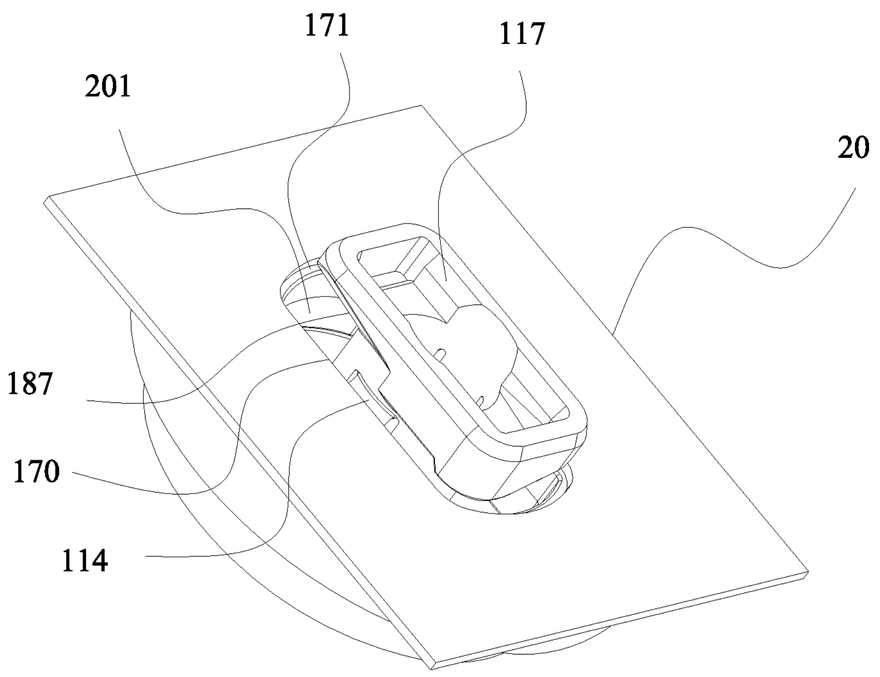

FIG. 7*b* is a perspective view at another angle of the fastener connecting assembly in FIG. 4*a* inserted into but not fastened to the carrier.

Figure 8:
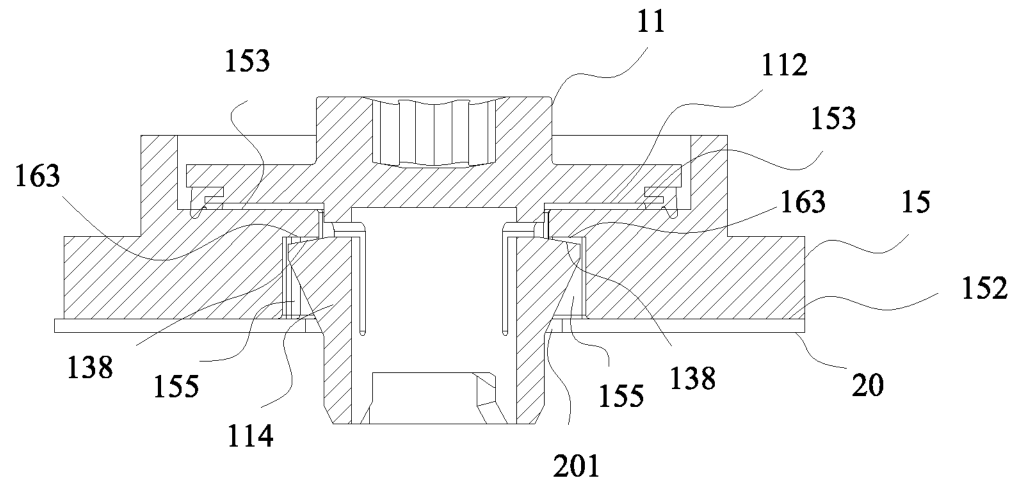

FIG. 8 is a sectional view of the fastener connecting assembly in FIG. 4*a inserted into but not fastened to the carrier.*

Figure 9A:
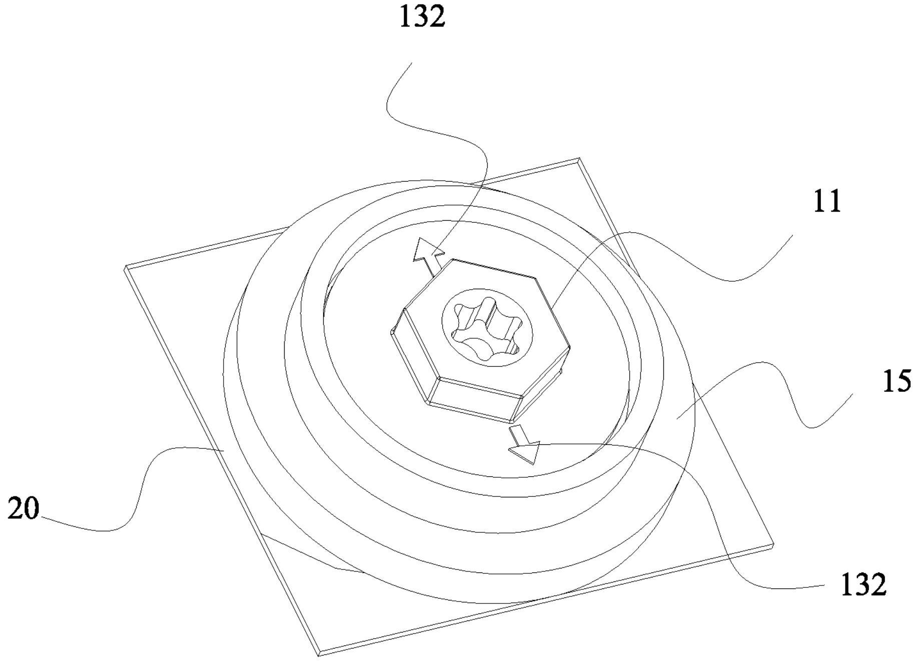

FIG. 9*a* is a perspective view at an angle of the fastener connecting assembly in FIG. 4*a* inserted into and fastened to the carrier.

Figure 9B:
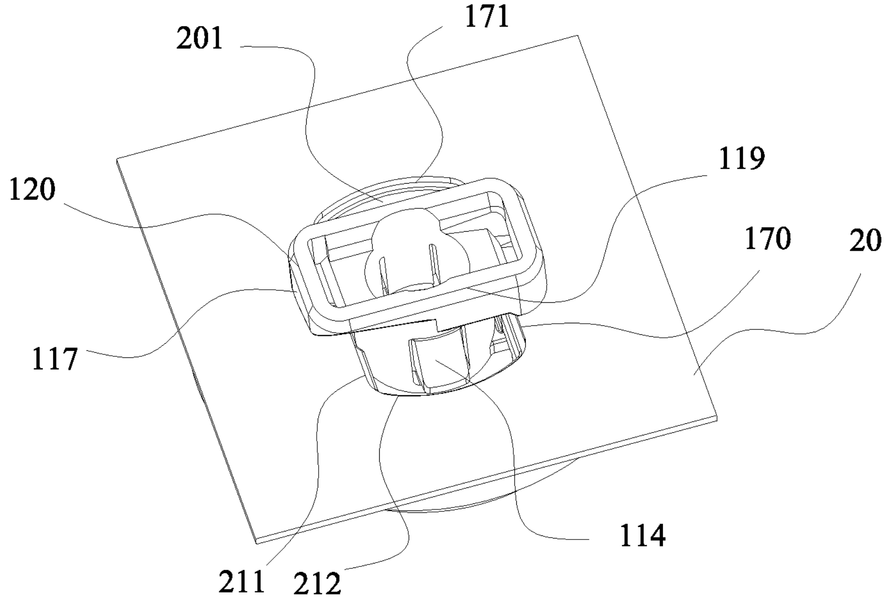

FIG. 9*b* is a perspective view at another angle of the fastener connecting assembly in FIG. 4*a* inserted into and fastened to the carrier.

Figure 10:
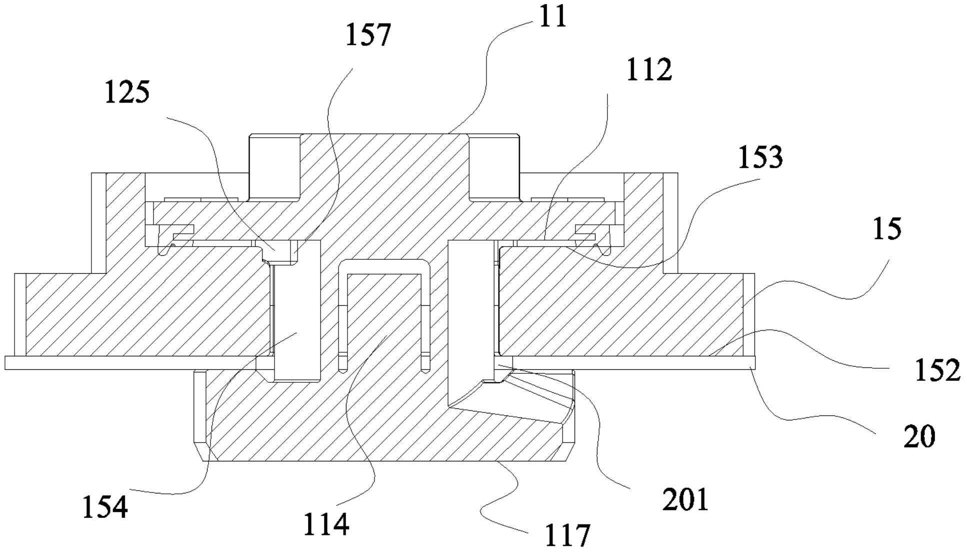

FIG. 10 is a sectional view of the fastener connecting assembly in FIG. 4*a* inserted into and fastened to the carrier.

DETAILED DESCRIPTION

Various specific implementations of the present disclosure will be described below with reference to the accompanying drawings which constitute part of this description. It should be understood that, where possible, the same or similar reference signs used in the present disclosure refer to the same components.

The terms used to indicate orientations in the present disclosure include but are not limited to "upper" and "lower", which are described with reference to the directions in accompanying drawings, and should not constitute any limitation to the present disclosure.

According to an aspect of the present disclosure, the fastener of the present disclosure is configured to fasten the fastening attachment to the carrier. The fastener comprises a support disc and an engaging mechanism. The support disc has a support disc supporting surface at the lower side. The engaging mechanism is configured to connect the fastening attachment. The engaging mechanism extends from the support disc supporting surface, and the engaging mechanism comprises a rod, a head and a pair of deflectable support members. A proximal end of the rod is connected to the support disc supporting surface. The head is disposed at a distal end of the rod. The pair of deflectable support members are disposed on the rod and comprise support member supporting surfaces facing the support disc, and a pre-assembling clamping space is defined between the support member supporting surfaces and the support disc to clamp at least part of the thickness of the fastening attachment.

In the fastener as described above, the head has a substantially rectangular cross section, and a dimension of the rod in a direction parallel to a length direction of the head is smaller than that of the head in the length direction.

In the fastener as described above, the deflectable support members of the pair of deflectable support members are respectively located above the long walls of a pair of long walls of the head, and the support member supporting surfaces of the pair of deflectable support members outwardly extend beyond the corresponding long walls in a direction parallel to a width of the head.

In the fastener as described above, the pair of deflectable support members further comprises connecting ends and outer walls. The connecting ends are opposite to the support member supporting surfaces, and the pair of deflectable support members is connected to the rod at the connecting ends. The pair of deflectable support members is overhung toward the support disc from the connecting ends to the support member supporting surfaces such that the pair of deflectable support members is deflectable about the connecting ends toward or away from the rod. The outer walls extend obliquely and outwardly relative to the rod from the connecting ends to the support member supporting surfaces.

In the fastener as described above, a shoulder is formed at a connection position of the rod and the support disc supporting surface, and the shoulder, the support disc supporting surface and the support member supporting surfaces define the pre-assembling clamping space.

In the fastener as described above, a pair of windows is provided on the rod, and the deflectable support members of the pair of deflectable support members are at least partially located in the windows of the pair of windows respectively.

In the fastener as described above, the rod is hollow to define a cavity such that the pair of deflectable support members could at least partially enter the cavity through the pair of windows when being deflected due to a force applied toward the rod.

In the fastener as described above, a pair of limiting projections is provided on the rod and located between the support member supporting surfaces of the pair of deflectable support members and the support disc supporting surface in a height direction of the rod, and the limiting projections of the pair of limiting projections are located above the short edges of a pair of short edges of the head respectively so as to be offset from the pair of deflectable support members in a direction rotating the fastener.

According to another aspect of the present disclosure, the fastener connecting assembly of the present disclosure comprises a fastener and a fastening attachment. The fastener has a pre-assembling position and a fastening position relative to the fastening attachment, and the fastener is rotatable relative to the fastening attachment between the pre-assembling position in which the fastener is connected to the fastening attachment to form the fastener connecting assembly, and the fastening position in which the fastener connecting assembly is fastened to the carrier. The fastener comprises a support disc and an engaging mechanism. The support disc has a support disc supporting surface at the lower sider. The engaging mechanism is configured to connect the fastening attachment. The engaging mechanism extends from the support disc supporting surface, and the engaging mechanism comprises a rod, a head and a pair of deflectable support members. A proximal end of the rod is connected to the support disc supporting surface. The head has a substantially rectangular cross section and is disposed at a distal end of the rod. A dimension of the rod in a direction parallel to a length direction of the head is smaller than that of the head in the length direction. The pair of deflectable support members is disposed on the rod and comprises support member supporting surfaces facing the support disc, and a pre-assembling clamping space is defined between the support member supporting surfaces and the support disc. The fastening attachment comprises a fastening attachment opening. The fastening attachment opening is substantially a cuboid. The fastening attachment opening is sized to allow the head to be insertable through the fastening attachment opening such that the fastening attachment opening surrounds at least part of the rod. When the fastener is in the pre-assembling position, at least part of a thickness of the fastening attachment is clamped in the pre-assembling clamping space, and the fastening attachment opening is configured to provide a rotation space for the rod so as to allow the fastener to be rotatable between the pre-assembling position and the fastening position.

In the fastener connecting assembly as described above, the deflectable support members of the pair of deflectable support members are respectively located above the head of a pair of long walls of the head, and when the fastener is in the pre-assembling position, the support member supporting surfaces of the pair of deflectable support members respectively extend outwardly beyond a pair of long walls of the fastening attachment opening in a direction parallel to a width of the fastening attachment opening.

In the fastener connecting assembly as described above, the pair of deflectable support members further comprises connecting ends and outer walls. The connecting ends are opposite to the support member supporting surfaces, and the pair of deflectable support members is connected to the rod at the connecting ends, wherein the pair of deflectable support members is overhung toward the support disc from the connecting ends to the support member supporting surfaces such that the pair of deflectable support members is deflectable about the connecting ends toward or away from the rod. The outer walls obliquely outwardly extend relative to the rod from the connecting ends to the support member supporting surfaces.

In the fastener connecting assembly as described above, the fastening attachment further comprises an outer frame, a pair of pre-assembling limiting grooves and a pair of first rotation guiding grooves. The outer frame has a first engagement surface and a second engagement surface that are opposite to each other, the first engagement surface and the second engagement surface are respectively configured to engage the carrier and the support disc, and the fastening attachment opening runs through the first engagement surface and the second engagement surface. The pair of pre-assembling limiting grooves is provided in the first engagement surface, each located at the long walls of the pair of long walls of the fastening attachment opening respectively, and in communication with the fastening attachment opening, wherein pre-assembling limiting grooves of the pair of pre-assembling limiting grooves at least partially receive the deflectable support members of the pair of deflectable support members respectively when the fastener is in the pre-assembling position. The pair of first rotation guiding grooves is provided in the first engagement surface and is in communication with the pair of pre-assembling limiting grooves and the fastening attachment opening so as to enable, when the fastener is rotated from the pre-assembling position to the fastening position, the pair of deflectable support members to rotate out of the pair of pre-assembling limiting grooves through the pair of first rotation guiding grooves.

In the fastener connecting assembly as described above, a shoulder is formed at a connection position of the rod and the support disc supporting surface, and the shoulder, the support disc supporting surface and the support member supporting surfaces define the pre-assembling clamping space.

In the fastener connecting assembly as described above, a pair of windows is provided on the rod, and the pair of deflectable support members are at least partially located in the pair of windows.

In the fastener connecting assembly as described above, the rod is hollow to define a cavity such that the pair of deflectable support members could at least partially enter, when being deflected due to a force applied toward the rod, the cavity through the pair of windows.

In the fastener connecting assembly as described above, the fastener further comprises a pair of limiting projections. The pair of limiting projections is disposed on the rod and each limiting projection is located respectively between the support member supporting surfaces of the pair of deflectable support members and the support disc supporting surface in a height direction of the rod, and the pair of limiting projections is located above a pair of short edges of the head respectively so as to be offset from the pair of deflectable support members in a direction of rotation of the fastener. The fastening attachment further comprises a pair of fastening limiting grooves and a pair of second rotation guiding grooves. The pair of fastening limiting grooves is provided in the second engagement surface, and each fastening limiting groove is located at the pair of long edges of the fastening attachment opening respectively and is in communication with the fastening attachment opening, wherein the fastening limiting grooves of the pair of fastening limiting grooves at least partially receive the limiting projections of the pair of limiting projections respectively when the fastener is in the fastening position. The pair of second rotation guiding grooves is provided in the second engagement surface and is in communication with the pair of fastening limiting grooves and the fastening attachment opening so as to enable, when the fastener is rotated from the pre-assembling position to the fastening position, the pair of limiting projections to rotate into the pair of fastening limiting grooves through the pair of second rotation guiding grooves.

In the fastener connecting assembly as described above, each pre-assembling limiting groove of the pair of pre-assembling limiting grooves is provided with pre-assembling limiting walls to respectively restrict the deflectable support members of the pair of deflectable support members from leaving the pair of pre-assembling limiting grooves.

In the fastener connecting assembly as described above, the pair of fastening limiting grooves is provided with fastening limiting walls to restrict the fastener from excessive rotation beyond the fastening position from the pre-assembling position. The bottoms of the pair of second rotation guiding grooves are higher than the bottoms of the pair of fastening limiting grooves to restrict the reverse rotation of the fastener from the fastening position to the pre-assembling position.

Figure 1A:
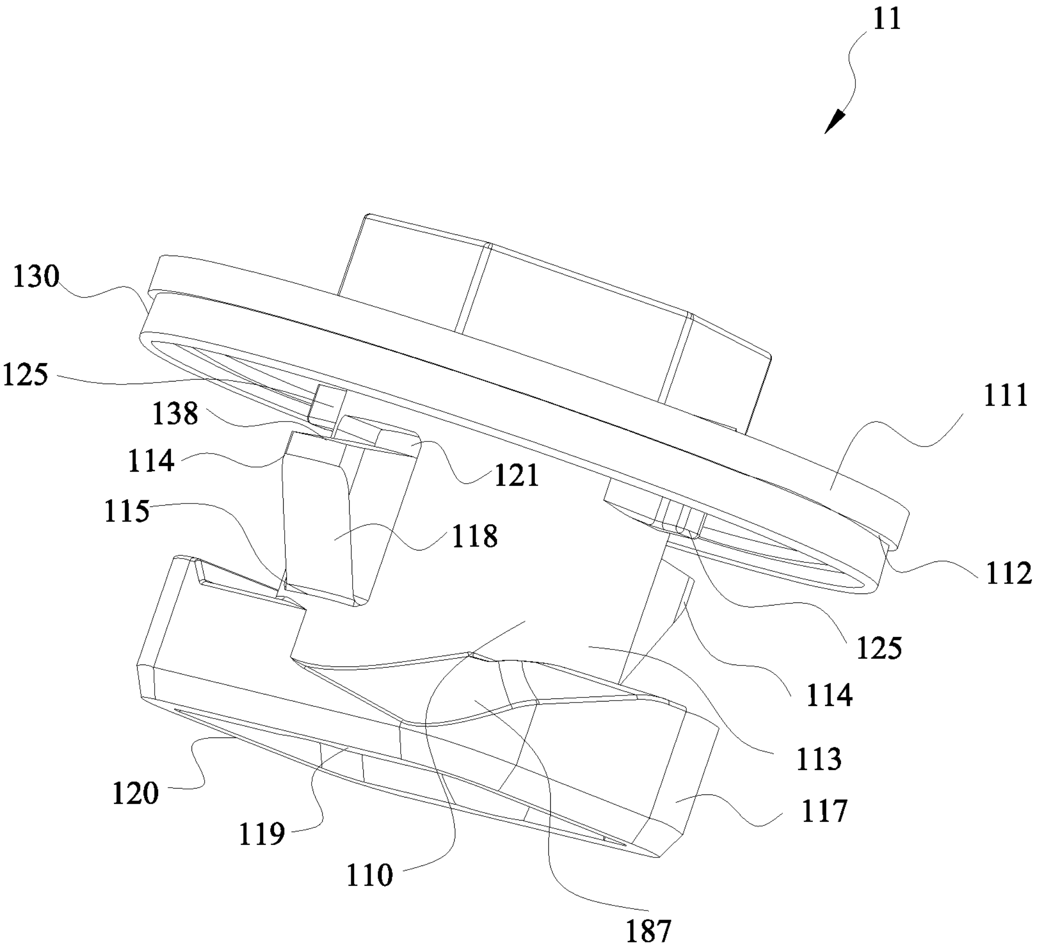
FIG. 1*a* is a perspective view of a fastener at an angle according to the present disclosure.
Figure 1B:
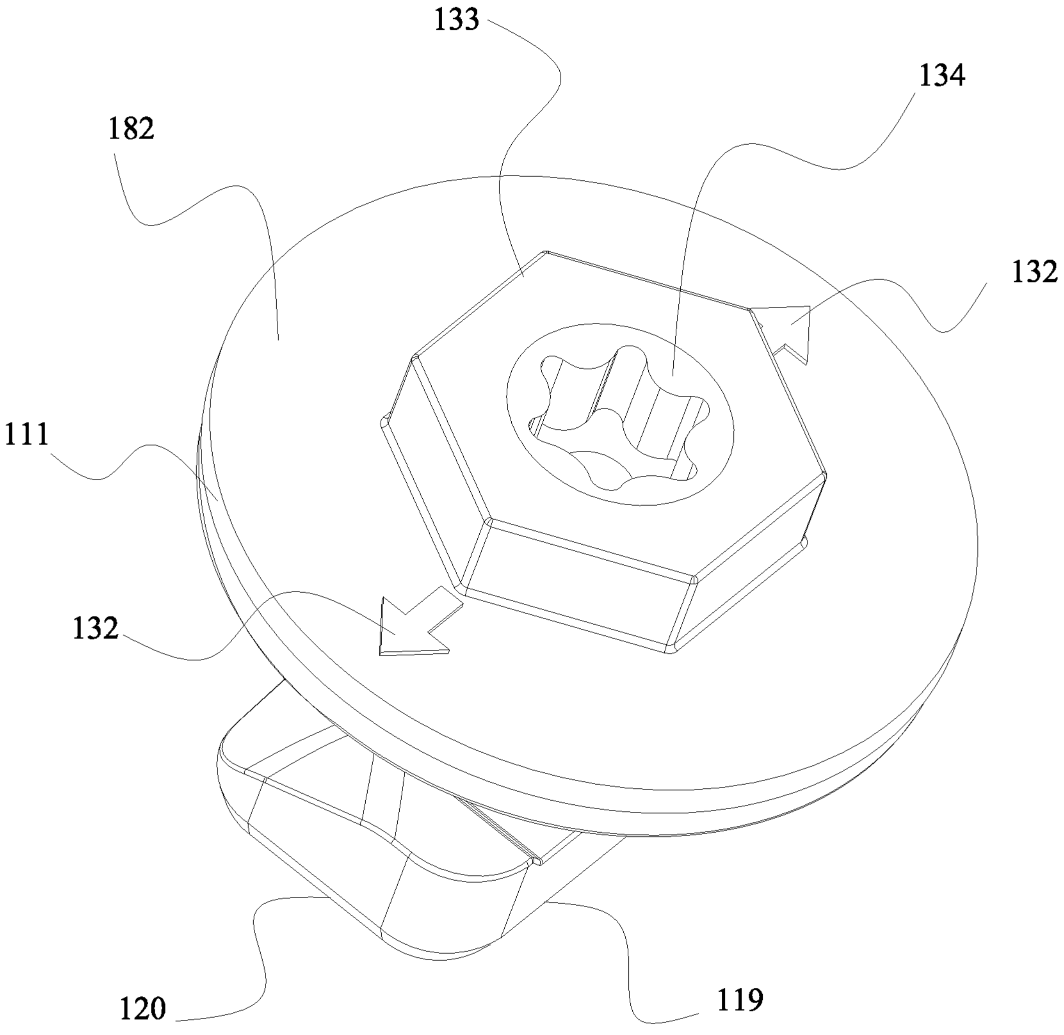
FIG. 1*b* is a perspective view of the fastener shown in FIG. 1*a* at another angle.
Figure 3A:
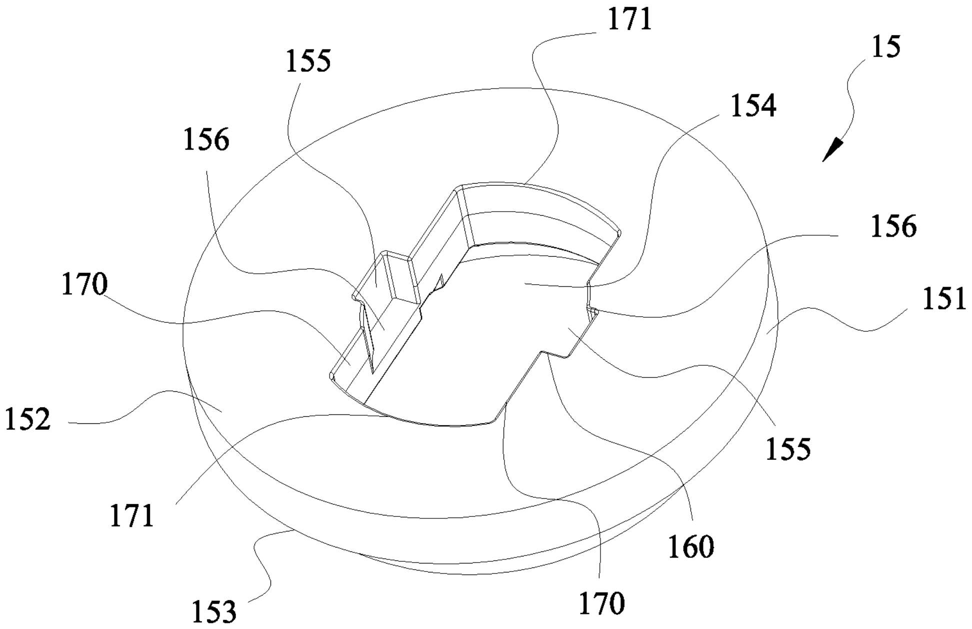
FIG. 3*a* is a perspective view at an angle of a fastening attachment according to the present disclosure.
Figure 3B:
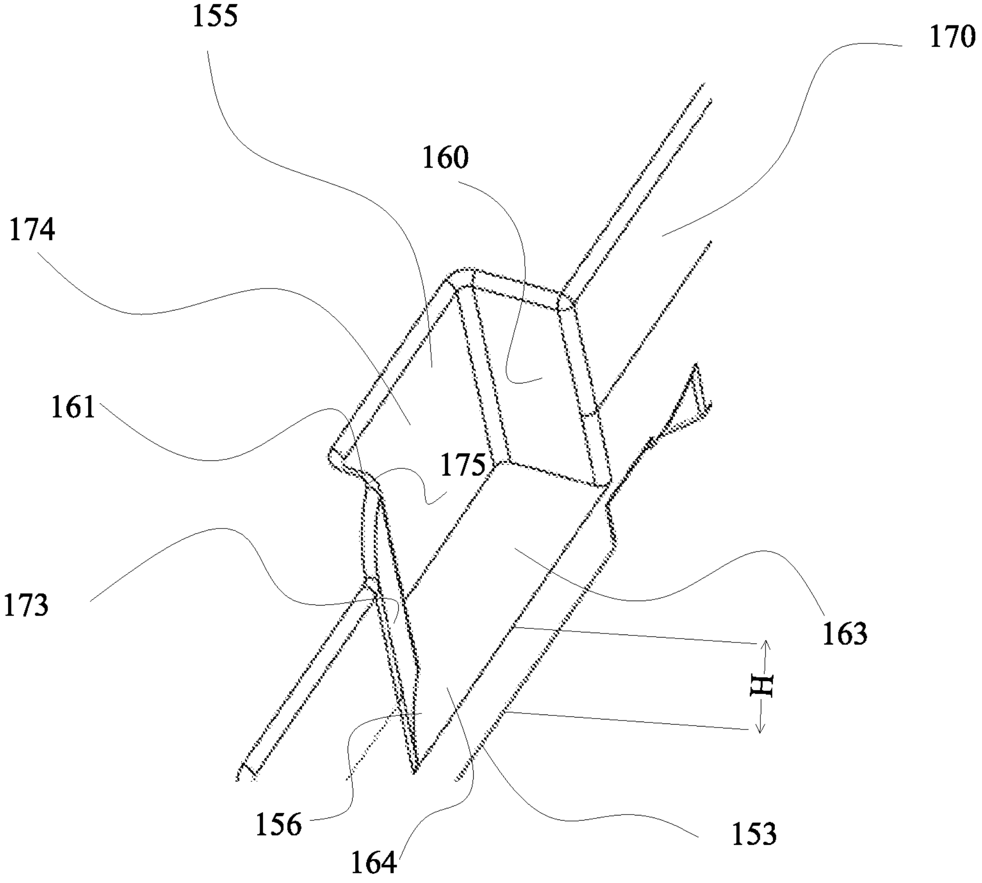
FIG. 3*b* is an enlarged view of a pre-assembling limiting groove and a rotation guiding groove in FIG. 3*a*.
Figure 3C:
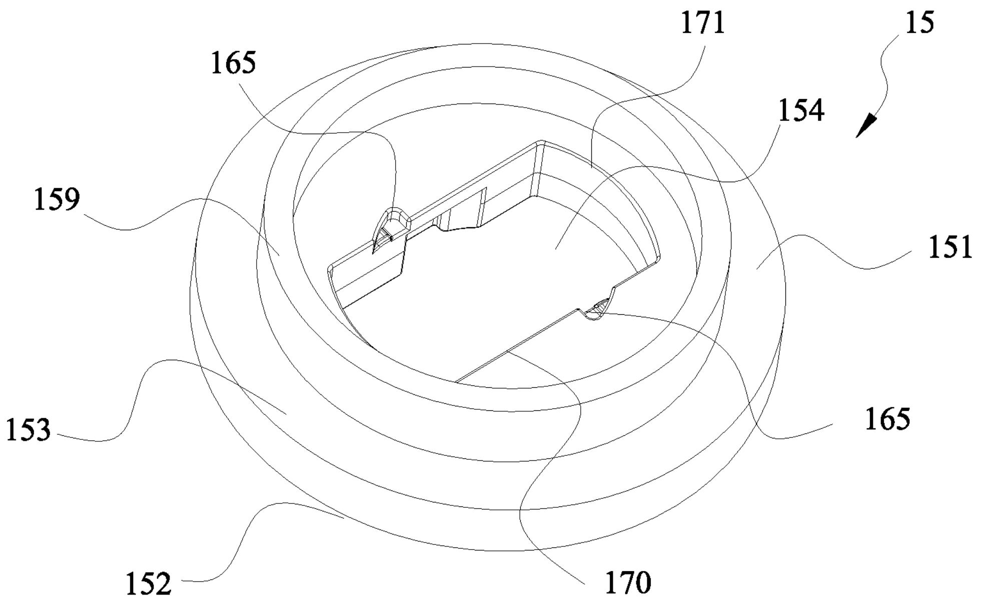
FIG. 3*c* is a perspective view at another angle of the fastening attachment shown in FIG. 3*a*.

In the present disclosure, a fastening attachment 15 (as shown in FIGS. 3*a* and 3*c*) is connected to a carrier 20 (as shown in FIG. 6) by means of a fastener 11 (as shown in FIGS. 1*a* and 1*b*). The fastener 11 is pre-inserted into and connected to the fastening attachment 15 to form a fastener connecting assembly 10 (as shown in FIG. 4*a* to FIG. 5*b*) such that the fastener 11 is in a pre-assembling position relative to the fastening attachment 15. The structures of the fastening attachment 15 and the fastener 11 enable the fastener 11 to remain in the pre-assembling position relative to the fastening attachment 15 during storage and transportation. The fastener connecting assembly 10 could then be transported to a final assembly location where the fastener connecting assembly 10 is connected to the carrier 20. In order to fasten the fastener connecting assembly 10 to the carrier 20, the fastener 11 is rotated relative to the fastening attachment 15 and the carrier 20 to position the fastener 11 in a fastening position (as shown in FIG. 9*a* to FIG. 10) relative to the fastening attachment 15. In an embodiment, the fastening attachment 15 is a plastic vehicle body trim panel, and the carrier 20 is a vehicle body metal frame.

FIGS. 1*a* and 1*b* are perspective views of the fastener 11 at different angles according to the present disclosure. As shown in FIG. 1*a*, the fastener 11 comprises a support disc 111 and an engaging mechanism 110 that are formed integrally. The support disc 111 has a supporting surface 112 on the lower side, and the engaging mechanism 110 extends from the supporting surface 112 for connecting the fastening attachment 15. A sealing ring 130 is disposed adjacent an outer edge of the supporting surface 112. The sealing ring 130 engages the supporting surface 112 in a suitable manner. On the one hand, the sealing ring 130 ensures sealing between the fastener 11 and the fastening attachment 15 as required, and on the other hand, the sealing ring 130 provides a certain degree of axial elastic pre-tightening. The axial pre-tightening of the sealing ring 130 is further especially conducive to error compensation and tight fitting between the fastening attachment 15 and the carrier 20. Although in the embodiment shown in FIG. 1*a*, the sealing ring 130 is shown disposed on the fastener 11, the sealing ring 130 may be disposed on the fastening attachment 15 in other embodiments.

Continue to refer to FIG 1*a*, the engaging mechanism 110 comprises a rod 113 and a head 117 that are formed integrally. The rod 113 is connected to the supporting surface 112 at a proximal end, and is connected to the head 117 at a distal end, such that the rod 113 is located between the supporting surface 112 and the head 117. A shoulder 139 is formed at a connection of the rod 113 and the supporting surface 112 of the support disc 111. The head 117 has a substantially rectangular cross section such that the head 117 has a pair of opposite long walls 119 and a pair of opposite short walls 120. A dimension of the rod 113 in a direction parallel to a length direction of the head 117 is less than that of the head 117 in the length direction. The rod 113 is provided with a pair of deflectable support members 114 formed integrally with the rod 113. The deflectable support members 114 of the pair of deflectable support members 114 are respectively located above the pair of long walls 119 and respectively disposed between the pair of long walls 119 and the support disc 111. Each deflectable support member of the pair of deflectable support members 114 has a support member supporting surface 138 facing the support disc 111. The pair of deflectable support members 114 further comprises connecting ends 115 opposite to the support member supporting surfaces 138, and the pair of deflectable support members 114 is connected to the rod 113 at the corresponding connecting ends 115 and is overhung toward the support disc 111 from the corresponding connecting ends 115 to the corresponding support member supporting surfaces 138, such that the pair of deflectable support members 114 can be elastically deflected toward the rod 113 about the corresponding connecting ends 115 and can deflect back to the initial position after being deflected toward the rod 113.

The pair of deflectable support members 114 further comprises outer walls 118 that extend obliquely and outwardly relative to the rod 113 from the corresponding connecting ends 115 to the corresponding support member supporting surfaces 138. In the embodiment shown in FIG. 1*a*, the deflectable support members 114 of the pair of deflectable support members 114 are deflectable bosses. It should be understood that the deflectable support members 114 have other structures in other embodiments.

Continue to refer to FIG. 1*a*, the rod 113 is further provided with a pair of limiting projections 125 with each limiting projection 125 of the pair of limiting projections 125 being located between the support member supporting surface 138 of one deflectable support member 114 and the supporting surface 112 in a height direction of the rod 113. Moreover, each limiting projection 125 of the pair of limiting projections 125 is respectively located above the pair of short walls 120 of the head 117 so as to be offset from the pair of deflectable support members 114 in a direction rotating the fastener 11.

FIG. 1*a* shows that the head 117 of the fastener 11 has a wedge-shaped surface 187. As the fastener 11 is being rotated relative to the fastening attachment 15 and the carrier 20, the wedge-shaped surface 187 is sliding on a surface of the carrier 20. The wedge-shaped surface 187 allows the head 117 of the fastener 11 to slide smoothly on the surface of the carrier 20, and the wedge-shaped surface 187 presses against the surface of the carrier 20 more strongly as an angle of rotation gradually increases such that the fastening attachment 15 is fastened to the carrier 20.

With reference to FIG. 1*b*, FIG. 1*b* shows that the support disc 111 is provided with a hexagonal head 133 for engaging a tool on an outer surface 182 opposite the supporting surface 112 . The hexagonal head 133 is provided with a hexagonal mounting seat 134 therewithin so that the rotation of the fastener 11 relative to the fastening attachment 15 and the carrier 20 can be achieved with a ring wrench or open-ended wrench or with a hexagonal nut. The outer surface 182 is provided with arrows 132 for indicating that the fastener 11 is rotated to reach the fastening position (as shown in FIG. 9*a*).

Figure 2:
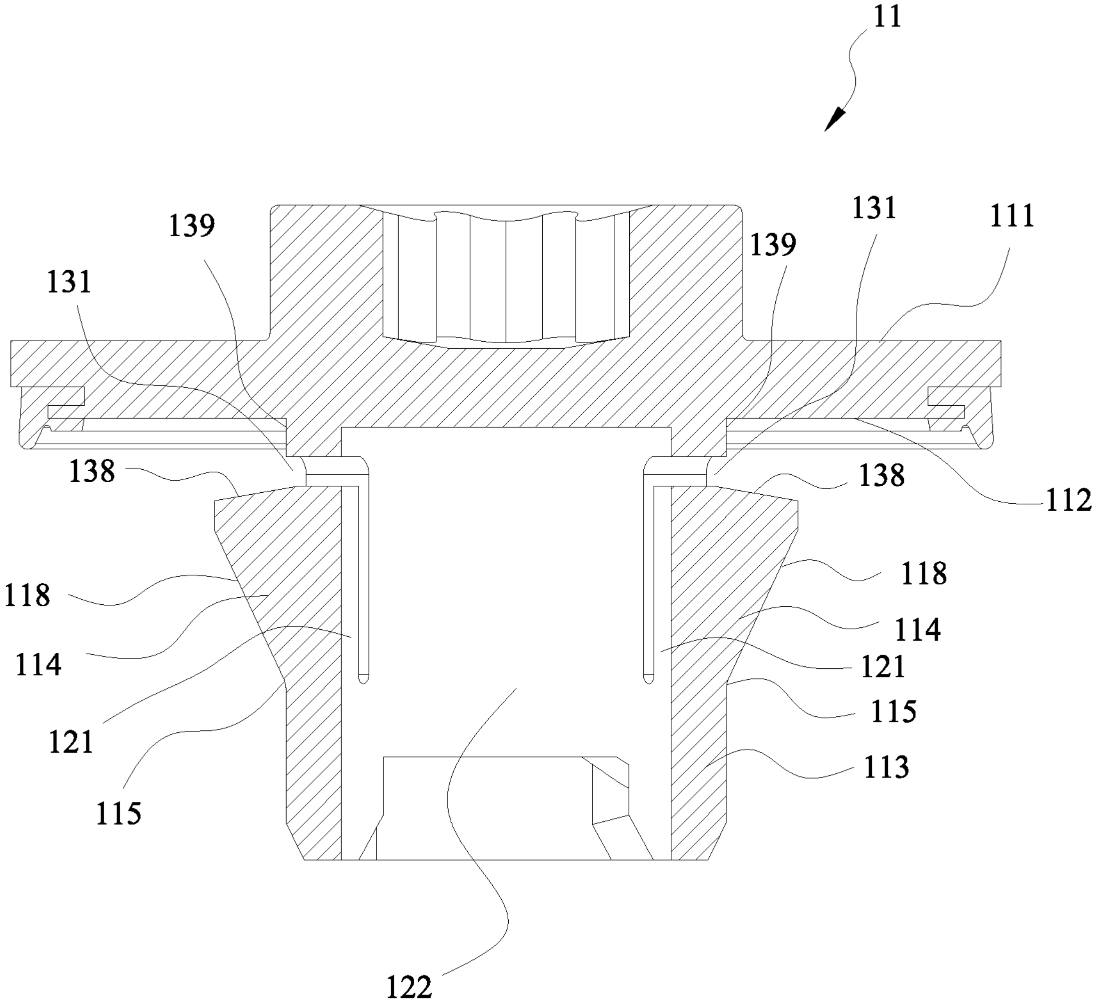
FIG. 2 is a sectional view of the fastener in FIG. 1*a*.

FIG. 2 shows a longitudinal sectional view of the fastener 11, and the longitudinal section passes through the pair of deflectable support members 114. As shown in FIG. 2, the rod 113 is hollow to define a cavity 122. The rod 113 is provided with a pair of windows 121 which runs through a thickness of the rod 113 to enable the communication between the cavity 122 and the outside of the rod 113. The connecting ends 115 of the pair of deflectable support members 114 are located at the lower ends of the corresponding windows 121 such that the pair of deflectable support members 114 overhangs from the lower ends of the corresponding windows 121 to the support disc 111, which causes the pair of deflectable support members 114 to be at least partially located within the corresponding windows 121. The pair of deflectable support members 114 at least partially enters the cavity 122 through the corresponding windows 121 when the pair of deflectable support members 114 is deflected about the connecting ends 115 toward the rod 113 due to a force exerted onto the pair of deflectable support members 114 toward the rod 113. Therefore, the cavity 122 provides a deflection space for the pair of deflectable support members 114.

As shown in FIG. 2, the deflectable support members 114 are disposed on the rod 113 in such a manner that the deflectable support members 114 have heights enough to provide their inclined outer walls 118 with long inclination lengths, which is conducive to guiding the deflectable support members 114 to be inserted through an opening 154 of the fastening attachment 15 (as shown in FIGS. 3*a* and 3*b*). FIG. 2 shows that the support member supporting surfaces 138, the supporting surface 112 of the support disc 111 and the shoulder 139 define a pre-assembling clamping space 131 for clamping at least part of the thickness of the fastening attachment 15, so as to hold the fastener 11 in the pre-assembling position relative to the fastening attachment 15. In a direction parallel to a width of the head 117, the support member supporting surfaces 138 of the pair of deflectable support members 114 respectively extend outwardly beyond the corresponding long walls 119 of the head 117. As will be discussed below, such a configuration enables at least part of the thickness of the fastening attachment 15 to be clamped in the pre-assembling clamping space 131. With reference to FIG. 2, the support member supporting surfaces 138 extend obliquely and outwardly toward the head 117, which enables the pre-assembling clamping space 131 to clamp fastening attachments having various thicknesses.

Figure 3D:
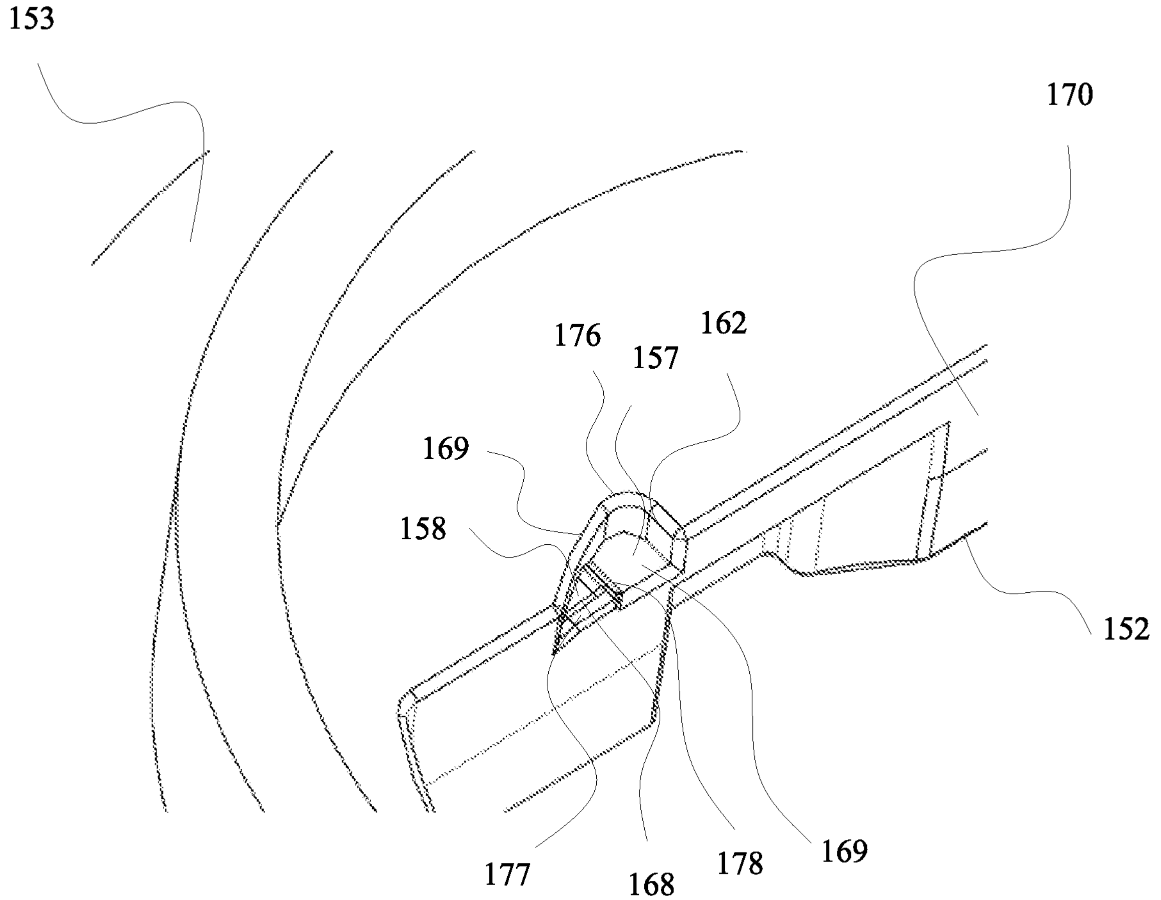
FIG. 3*d* is an enlarged view of a fastening limiting groove and a rotation guiding groove in FIG. 3*c*.

FIG. 3*a* and FIG. 3*c* show perspective views of the fastening attachment 15 at different viewing angles, FIG. 3*b* shows an enlarged view of a pre-assembling limiting groove 155 and a rotation guiding groove 156 in FIG. 3*a*, and FIG. 3*d* shows an enlarged view of a fastening limiting groove 157 and a rotation guiding groove 158 in FIG. 3*c*. As shown in FIGS. 3*a* and 3*b*, the fastening attachment 15 comprises an outer frame 151 having a first engagement surface 152 and a second engagement surface 153 that are opposite to each other and respectively configured to engage the carrier 20 and the support disc 111. The outer frame 151 is formed with a fastening attachment opening 154 therewithin, which runs through the first engagement surface 152 and the second engagement surface 153. The fastening attachment opening 154 has a substantially cuboid shape so as to have a pair of opposite long walls 170 and a pair of opposite short walls 171. The length and the width of the fastening attachment opening 154 are respectively slightly greater than the length and the width of the head 117 of the fastener 11 so as to allow the head 117 of the fastener 11 to be inserted through the fastening attachment opening 154 to enable the fastening attachment opening 154 to surround at least part of the rod 113. Also, the fastening attachment opening 154 is configured to provide a rotation space for the rod 113 so as to allow the fastener 11 to be rotated between the pre-assembling position and the fastening position. The width of the fastening attachment opening 154 is smaller than the length of the head 117 of the fastener 11 to block the head 117 of the fastener 11 from being pulled out of the fastening attachment opening 154 when the length of the head 117 of the fastener 11 is transverse to the width of the fastening attachment opening 154.

FIG. 3*a* shows that a pair of pre-assembling limiting grooves 155 is provided in the first engagement surface 152 and each pre-assembling limiting groove 155 is respectively located at one long wall 170 of a pair of long walls 170 of the fastening attachment opening 154 and is in communication with the fastening attachment opening 154. When the fastener 11 is in the pre-assembling position, each pre-assembling limiting groove 155 of the pair of pre-assembling limiting grooves 155 at least partially receives one deflectable support member 114 of the pair of deflectable support members 114 respectively . The structure of the pre-assembling limiting grooves 155 is described with reference to FIG. 3*b*. As shown in FIG. 3*b*, the pre-assembling limiting groove 155 extends from the first engagement surface 152 toward the second engagement surface 153 by a portion of the thickness of the outer frame 151 such that the pre-assembling limiting groove 155 comprises an end wall 174, a bottom wall 163 and opposite pre-assembling limiting walls 160 and 161 substantially perpendicular to the long walls 170 of the fastening attachment opening 154. A thickness H is defined between the bottom wall 163 and the second engagement surface 153. When the fastener 11 is in the pre-assembling position relative to the fastening attachment 15, the thickness H between the bottom wall 163 and the second engagement surface 153 is clamped in the pre-assembling clamping space 131 of the fastener 11. The pre-assembling limiting wall 160 extends from the end wall 174 to the long wall 170 in a direction substantially perpendicular to the long wall 170 of the fastening attachment opening 154, and the pre-assembling limiting wall 161 extends from the end wall 174 of the pre-assembling limiting groove 155 to a position at a certain distance from the long wall 170 in a direction substantially perpendicular to the long wall 170 of the fastening attachment opening 154, such that the pre-assembling limiting wall 161 is shorter than the pre-assembling limiting wall 160. The pre-assembling limiting walls 160 and 161 can block the rotation of the deflectable support members 114, preventing the deflectable support members 114 from rotating out of the corresponding pre-assembling limiting grooves 155 during storage and transportation after the deflectable support members 114 enter the corresponding pre-assembling limiting grooves 155.

With further reference to FIG. 3*a*, the first engagement surface 152 is also provided with a pair of rotation guiding grooves 156. Each rotation guiding groove 156 of the pair of rotation guiding grooves 156 is respectively in communication with one pre-assembling limiting groove 155 of the pair of pre-assembling limiting grooves 155 and with the fastening attachment opening 154, and is respectively located in the downstream of a corresponding one pre-assembling limiting groove 155 of the pair of pre-assembling limiting grooves 155 in the direction rotating the fastener 11 from the pre-assembling position to the fastening position. The structure of the rotation guiding groove 156 is described with reference to FIG. 3*b*. As shown in FIG. 3*b*, the rotation guiding groove 156 extends from the first engagement surface 152 toward the second engagement surface 153 by a same distance with the pre-assembling limiting groove 155, such that a bottom wall 164 of the rotation guiding groove 156 is flush with the bottom wall 163 of the pre-assembling limiting groove 155. The rotation guiding groove 156 has a rotation guiding wall 173 extending obliquely, toward the fastening attachment opening 154, from the pre-assembling limiting wall 161 to the corresponding long wall 170 of the fastening attachment opening 154, thus forming the rotation guiding groove 156. Since the rotation guiding groove 156 provides a space obliquely away from the fastening attachment opening 154 from the corresponding long wall 170 of the fastening attachment opening 154 to the pre-assembling limiting wall 161, the rotation guiding groove 156 provides a rotation space for the corresponding deflectable support member 114, such that the deflectable support member 114 can be rotated out of the corresponding pre-assembling limiting groove 155 through the corresponding rotation guiding groove 156 when the fastener 11 is rotated from the pre-assembling position to the fastening position. The connecting position between the rotation guiding wall 173 and the pre-assembling limiting wall 161 is a smooth transition which is configured to guide the deflectable support member 114 to rotate into the rotation guiding groove 156 from the pre-assembling limiting groove 155.

With reference to FIG. 3*c*, the second engagement surface 153 of the fastening attachment 15 is provided with a pair of grooves 165 having a same structure. Each groove 165 of the pair of grooves 165 is respectively located at two sides of the fastening attachment opening 154 and is in communication with the fastening attachment opening 154. The groove 165 extends from the second engagement surface 153 toward the first engagement surface 152 by a portion of the thickness of the outer frame 151. With further reference to FIG. 3*d*, the groove 165 comprises a fastening limiting wall 162 and a rotation guiding wall 169. The fastening limiting wall 162 and the rotation guiding wall 169 are connected by means of a smooth transition 176. The fastening limiting wall 162 extends from the smooth transition 176 to the long wall 170 in a direction substantially perpendicular to the long wall 170 of the fastening attachment opening 154. The rotation guiding wall 169 obliquely extends toward the fastening attachment opening 154 from the smooth transition 176 to the long wall 170. The groove 165 is provided with a projection 177 therein. The projection 177 has a projection end surface 178 extending from the rotation guiding wall 169 to the long wall 170 in a direction substantially perpendicular to the long wall 170 of the fastening attachment opening 154, and extends from a joint of the rotation guiding wall 169 and the long wall 170 to the projection end surface 178. The rotation guiding groove 158 is formed in a region where the projection 177 is located, and the fastening limiting groove 157 is formed in a region between the projection end surface 178 and the fastening limiting wall 162. Both the rotation guiding groove 158 and the fastening limiting groove 157 are in communication with the fastening attachment opening 154. The fastening limiting groove 157 is located in the downstream of the corresponding rotation guiding groove 158 in the direction rotating the fastener from the pre-assembling position to the fastening position and is in communication with the corresponding rotation guiding groove 158. Since the rotation guiding groove 158 provides a space which is obliquely away from the fastening attachment opening 154 from the joint of the rotation guiding wall 169 and the long wall 170 to the projection end surface 178, the rotation guiding groove 158 provides a rotation space for a limiting projection 125 on the fastener 11. Thus, when the fastener 11 is rotated from the pre-assembling position to the fastening position, the limiting projection 125 on the fastener 11 enters the fastening limiting groove 157 through the rotation guiding groove 158. Since the rotation guiding groove 158 is located in the region where the projection 177 is located, the bottom 168 of the rotation guiding groove 158 is higher than the bottom 169 of the fastening limiting groove 157, which enables the rotation guiding groove 158 to limit the limiting projection 125 of the fastener 11 from rotating from the fastening limiting groove 157 into the rotation guiding groove 158 due to the vibration in the running process of vehicles, thereby limiting the reverse rotation of the fastener 11 from the fastening position to the pre-assembling position due to the vibration in the running process of vehicles. Due to the pre-assembling limiting wall 162, when the fastener 11 is rotated from the pre-assembling position to the fastening position, each limiting projection 125 of the pair of limiting projections 125 of the fastener 11 enters the corresponding fastening limiting groove 157 and is blocked by the corresponding fastening limiting wall 162, such that the fastening limiting walls 162 indicate that the fastener 11 is rotated to arrive the fastening position, thus preventing the fastener 11 from being excessively rotated beyond the fastening position from the pre-assembling position. Moreover, the fastening limiting walls 162 can also limit the limiting projections 125 of the fastener 11 from rotating out of the fastening limiting grooves 157 due to the vibration in the running process of vehicles.

FIGS. 4*a* and 4*b* show perspective views of the fastener connecting assembly 10 formed by connecting the fastener 11 and the fastening attachment 15 at different viewing angles. FIGS. 5*a* and 5*b* show sectional views of the fastener connecting assembly 10 in FIGS. 4*a* and 4*b* at different positions. FIG. 5*a* shows the longitudinal sectional view of the fastener connecting assembly 10, and the longitudinal section passes through the pair of deflectable support members 114 of the fastener 11. FIG. 5*b* shows another longitudinal sectional view of the fastener connecting assembly 10, and the longitudinal section passes through one limiting projection 125 of the fastener 11. The connection between the fastener 11 and the fastening attachment 15 will be described in reference with FIG. 4*a* to FIG. 5*b*. When the fastener 11 and the fastening attachment 15 are in a connected state as shown in FIG. 4*a* to FIG. 5*b*, the fastener 11 is in the pre-assembling position relative to the fastening attachment 15 to achieve the connection between the fastener 11 and the fastening attachment 15, obtaining the fastener connecting assembly 10.

When it is necessary to connect the fastener 11 and the fastening attachment 15, the head 117 of the fastener 11 is positioned to face the second engagement surface 153 of the fastening attachment opening 154, and the head 117 of the fastener 11 is aligned to the fastening attachment opening 154 so as to insert the fastener 11 into the fastening attachment opening 154 in such a manner that the long wall 119 of the head 117 of the fastener 11 is substantially parallel to the long wall 170 of the fastening attachment opening 154, and the short wall 120 of the head 117 of the fastener 11 is substantially parallel to the short wall 171 of the fastening attachment opening 154. Since the length and the width of the fastening attachment opening 154 are respectively slightly greater than the length and the width of the head 117 of the fastener 11, the head 117 of the fastener 11 can be inserted through the fastening attachment opening 154. Since the length and the width of the fastening attachment opening 154 are only slightly greater than the length and the width of the head 117 of the fastener 11 respectively, it is easy to position the fastener 11 such that the pair of deflectable support members 114 are substantially aligned to a position where the pre-assembling limiting grooves 155 of the fastening attachment 15 are located when the fastener 11 is inserted into the fastening attachment opening 154.

The support member supporting surfaces 138 of the pair of deflectable support members 114 of the fastener 11 respectively extend beyond the pair of long walls 170 of the fastening attachment opening 154 in a direction parallel to the width of the fastening attachment opening 154. Therefore, when the head 117 of the fastener 11 passes through the fastening attachment opening 154, the outer walls 118 of the pair of deflectable support members 114 of the fastener 11 can respectively engage with the long walls 170 of the pair of long walls 170 of the fastening attachment opening 154. As the fastener 11 is further inserted into the fastening attachment opening 154, the outer walls 118 of the pair of deflectable support members 114 respectively slide downward with abutting against the pair of long walls 170 of the fastening attachment opening 154. In this process, the long walls 170 of the pair of long walls 170 of the fastening attachment opening 154 apply a force, toward the rod 113, to the deflectable support members 114 of the pair of deflectable support members 114 respectively, thus urging the pair of deflectable support members 114 to elastically deflect about the connecting ends 115 thereof toward the rod 113 to at least partially enter the cavity 122 of the rod 113. When the pair of deflectable support members 114 slides through the fastening attachment opening 154, as shown in FIGS. 4*b* and 5*a*, the deflectable support members 114 of the pair of deflectable support members 114 respectively enter the pre-assembling limiting groove 155 of the pair of pre-assembling limiting grooves 155, and the fastener 11 reaches the pre-assembling position relative to the fastening attachment 15. At this moment, the pair of deflectable support members 114 is no longer subjected to the force toward the rod 113, and thus deflects back away from the rod 113. As shown in FIG. 5*a*, after the pair of deflectable support members 114 respectively enters the pair of pre-assembling limiting grooves 155, the support member supporting surfaces 138 of the pair of deflectable support members 114 engage the bottom walls 163 of the pre-assembling limiting grooves 155, and the sealing ring 130 of the support disc 111 engages the second engagement surface 153 of the fastening attachment 15, such that a portion of the thickness of the fastening attachment 15 (that is, the thickness H between the bottom walls 163 of the pre-assembling limiting grooves 155 and the second engagement surface 153 of the fastening attachment 15) is clamped in the pre-assembling clamping space 131 of the fastener 11. Thus, the fastener 11 and the fastening attachment 15 are connected to form the fastener connecting assembly 10. Since the second engagement surface 153 of the fastening attachment 15 has already engaged the sealing ring 130 of the support disc 111 when the fastener 11 reaches the pre-assembling position relative to the fastening attachment 15, the fastener attachment 15 has arrived at its final position in an insertion direction of the fastener 11 when the fastener is in its pre-assembling position. When the fastener 11 is connected and fastened to the fastening attachment 15, the position of the fastening attachment 15 relative to the fastener 11 in the insertion direction of the fastener 11 no longer changes, except that the sealing ring 130 compensates for errors based on its axial preload to ensure a tight fit between the fastening attachment 15 and the carrier 20

As described above, each pre-assembling limiting groove of the pair of pre-assembling limiting grooves 155 has the pre-assembling limiting walls 161 and 160 approximately perpendicular to the pair of long walls 170 of the fastening attachment opening 154, which pre-assembling limiting walls 161 and 160 function as blocks to the deflectable support members 114 of the fastener 11 respectively in the direction rotating the fastener 11 from the pre-assembling position to the fastening position and in the reverse direction so as to prevent the fastener 11 from disconnecting from the fastening attachment 15 due to the fastener 11 accidentally rotating out of the pre-assembling limiting grooves 155 during storage and transportation. Therefore, the fastener 11 is held in the pre-assembling position relative to the fastening attachment 15 to keep the connection between the fastener 11 and the fastening attachment 15.

As shown in FIG. 5*b*, the pair of limiting projections 125 of the fastener 11 is in the fastening attachment opening 154 without contacting the fastening attachment 15 when the fastener 11 is in the pre-assembling position relative to the fastening attachment 15. In addition, as shown in FIG. 4*a*, when the fastener 11 is in the pre-assembling position relative to the fastening attachment 15, a pair of indicating arrows 132 on the outer surface 182 of the fastener 11 is in a first indicating position.

FIG. 6 shows a perspective view of the carrier 20. The carrier 20 comprises a carrier opening 201 configured to receive the fastener connecting assembly 10. The carrier opening 201 has a substantially rectangular shape, and therefore has a pair of long edges 211 and a pair of short edges 212. A length of the pair of long edges 211 and a length of the pair of short edges 212 are respectively greater than the dimensions of the head 117 of the fastener 11 in the length and width directions, such that the head 117 of the fastener 11 can be inserted through the carrier opening 201. The length of the pair of short edges 212 of the carrier opening 201 is smaller than the dimension of the head 117 of the fastener 11 in the length direction, such that the head 117 of the fastener 11 cannot be pulled out of the carrier opening 201 when the length of the head 117 of the fastener 11 spans across the width of the carrier opening 201.

FIG. 7*a* to FIG. 8 show a state of the fastener connecting assembly 10 when it is inserted into the carrier opening 201 but is not fastened to the carrier 20. FIG. 7*a* and FIG. 7*b* show perspective views at different angles of the fastener connecting assembly 10 inserted into the carrier opening 201. FIG. 8 shows a longitudinal sectional view of the fastener connecting assembly 10 inserted into the carrier opening 201, and the longitudinal section passes through the pair of deflectable support members 114 of the fastener 11.

To insert the fastener connecting assembly 10 into the carrier opening 201, the head 117 of the fastening clamp 11 is positioned to face the carrier 20, and the long walls 119 and the short walls 120 of the head 117 of the fastener 11 are positioned to be substantially parallel to the long edges 211 and the short edges 212 of the carrier opening 201 respectively. As shown in FIG. 7*b* and FIG. 8, After the fastener connecting assembly 10 is inserted into the carrier opening 201 but is not fastened to the carrier 20, a mounting relationship of the fastening attachment 15 and the fastener 11 is the same as that shown in FIG. 4*a* to FIG. 5*b*. That is to say, before the fastener connecting assembly 10 is inserted into the carrier opening 201 but is not fastened to the carrier 20, each deflectable support member 114 of the pair of deflectable support members 114 of the fastener 11 is respectively located in one pre-assembling limiting groove 155 of the pair of pre-assembling limiting grooves 155 of the fastening attachment 15, such that the thickness H of the fastening attachment 15 between the second engagement surface 153 of the fastening attachment 15 and the bottom walls 163 of the pair of pre-assembling limiting grooves 155 is clamped in the pre-assembling clamping space 131 of the fastener 11, and the pair of limiting projections 125 of the fastener 11 is located in the fastening attachment opening 154 without contacting the fastening attachment 15. As shown in FIG. 7*a*, when the fastener connecting assembly 10 is inserted into the carrier opening 201 but is not fastened to the carrier 20, the pair of indicating arrows 132 on the outer surface 182 of the fastener 11 remains in the first indicating positions.

FIG. 9*a* to FIG. 10 show a state when the fastener connecting assembly 10 is inserted into the carrier opening 201 and fastened to the carrier 20. FIG. 9*a* and FIG. 9*b* show perspective views at different angles of the fastener connecting assembly 10 inserted into the carrier opening 201 and fastened to the carrier 20. FIG. 10 shows a longitudinal sectional view of the fastener connecting assembly 10 inserted into the carrier opening 201 and fastened to the carrier 20, and the longitudinal section passes through the pair of limiting projections 125 of the fastener 11.

In order to fasten the fastener connecting assembly 10 to the carrier 20, the fastener 11 is rotated relative to the fastening attachment 15 and the carrier 20. The fastener 11 is rotated in such a manner that the pair of deflectable support members 114 of the fastener 11 is rotated from pre-assembling limiting grooves 155 toward the rotation guiding grooves 156. Due to the smooth transitions 175 between the pre-assembling limiting grooves 155 and the rotation guiding grooves 156 and the shorter pre-assembling limiting walls 161, when a driving tool for engaging the hexagonal head 133 of the fastener 11 applies an enough torsion to the fastener 11, the pair of deflectable support members 114 of the fastener 11 can be rotated out of the corresponding pre-assembling limiting grooves 155 under the guidance of the smooth transitions 175, and enters the corresponding rotation guiding grooves 156, and then continues to be rotated out of the corresponding rotation guiding grooves 156 under the guidance of the corresponding rotation guiding grooves 156, thus disengaging from the corresponding long walls 170 of the fastening attachment opening 154 and entering the fastening attachment opening 154. In the process of rotating the fastener 11, the pair of limiting projections 125 of the fastener 11 is rotated toward the rotation guiding grooves 158, and enters the fastening limiting grooves 157 after entering the rotation guiding grooves 158 under the guidance of the rotation guiding grooves 158. When the limiting projections 125 enter the fastening limiting grooves 157, the fastener 11 reaches the fastening position relative to the fastening attachment 15. The fastening limiting walls 162 of the fastening limiting grooves 157 serve as blocks against the limiting projections 125, and when the limiting projections 125 engage the fastening limiting walls 162, the blocking by the fastening limiting walls 162 indicates that the fastener 11 has already been rotated to reach the fastening position, preventing the fastener 11 from being excessively rotated beyond the fastening position. As the fastener 11 is rotated from the pre-assembling position toward the fastening position, the fastener is gradually rotated from the state when the length and the width of the head 117 are respectively parallel to the lengths and the widths of the fastening attachment opening 154 and the carrier opening 201, to the state when the length of the head 117 of the fastener span across the widths of the fastening attachment opening 154 and the carrier opening 201, such that the head 117 of the fastener cannot be pulled out of the fastening attachment opening 154 and the carrier opening 201 when the fastener 11 reaches the fastening position. In the process of rotating the head 117 of the fastener, a relatively thin portion of the wedge-shaped surface 187 of the head 117 of the fastener 11 first contacts the surface of the carrier 20 and slides on the surface of carrier 20. The wedge-shaped surface 187 allows the head 117 of the fastener 11 to slide smoothly on the surface of the carrier 20, and as the angle of rotation gradually increases, a relatively thick portion of the wedge-shaped surface 187 contacts the surface of the carrier 20, thereby pressing against the surface of the carrier 20 more strongly. When the length of the head 117 of the fastener spans across the widths of the fastening attachment opening 154 and the carrier opening 201, the head 117 of the fastener 11 fastens the fastening attachment 15 to the carrier 20.

FIGS. 9*b* and 10 show that when the fastener 11 reaches the fastening position, the length of the head 117 of the fastener 11 spans across the widths of the fastening attachment opening 154 and the carrier opening 201 with the head 117 pressing against the lower surface of the carrier 20, the upper surface of the carrier 20 engaging the first engagement surface 152 of the fastening attachment 15, and the second engagement surface 153 of the fastening attachment 15 engaging the sealing ring 130 of the fastener 11. Thus, the fastening attachment 15 and the carrier 20 are pressed between the support disc 111 and the head 117 of the fastener 11, and the fastening attachment 15 is thus fastened to the carrier 20. In the fastening position of the fastener 11, the pair of limiting projections 125 of the fastener 11 engages in the fastening limiting grooves 157 of the fastening attachment 15. The fastening limiting walls 162 of the fastening limiting grooves 157 and the projections 177 of the rotation limiting grooves 158 limit the movement of the corresponding limiting projections 125 in a length direction of the fastening attachment opening 154, so that when the vehicle encounters vibrations or other situations in the running process, the limiting projections 125 are prevented from rotating out of the corresponding fastening limiting grooves 157 in the direction rotating the fastener 11 from the pre-assembling position to the fastening position and in the reverse direction. It can be seen from FIG. 9*b* that when the fastener 11 reaches the fastening position, the pair of deflectable support walls 114 enters the fastening attachment opening 154 to disengage from the fastening attachment 15. It can be seen from FIG. 9*a* that, when the fastener 11 reaches the fastening position, the positions of the indicating arrows 132 on the outer surface 182 of the fastener 11 change to indicate that the fastener 11 is rotated to be in place.

The fastening attachment 15 and the carrier 20 can be unfastened from the fastener 11 by reversely rotating the fastener 11 from the fastening position to the pre-assembling position of the fastener 11. When the fastener 11 is reversely rotated and a force for reverse rotation applied to the fastener 11 reaches a certain value, the pair of limiting projections 125 of the fastener 11 can be rotated out of the fastening limiting grooves 157 to enter the rotation guiding grooves 158, and then disengages from the fastening attachment 15 under the guidance of the rotation guiding grooves 158. When the fastener 11 is reversely rotated to the pre-assembling position, the limiting projections 125 enter the fastening attachment opening 154, thereby disengaging from the fastening attachment 15. In the process of reversely rotating the fastener 11, the pair of deflectable support members 114 of the fastener 11 is rotated into the rotation guiding grooves 156, and enters the pre-assembling limiting grooves 155 under the guidance of the rotation guiding grooves 156. At this moment, the fastener 11 is reversely rotated back to the pre-assembling position from the fastening position, and the length and the width of the head 117 of the fastener 11 are parallel to the lengths and the widths of the carrier opening 201 and the fastening attachment opening 154. Since the support member supporting surfaces 138 extend obliquely and outwardly toward the head 117 at this moment, the head 117 of the fastener 11 can be pulled out of the carrier opening 201 to disconnect the fastening connector 10 from the carrier 20, thereby disconnecting the fastening attachment 15 from the carrier 20.

The present disclosure has at least the following technical effects.

The inclined long outer walls 118 of the deflectable support members 114 of the present disclosure allow the deflectable support members 114 to be susceptible to elastically deflect by force when the deflectable support members 114 are inserted into the fastening attachment opening 154. This is conducive to reducing an insertion resistance when the fastener 11 is inserted into the fastening attachment opening 154.

The fastener 11 and the fastening attachment 15 of the present disclosure are simple in structure and easy to manufacture.

Since the fastener 11 is provided with only a pair of deflectable support members 114 and a pair of limiting projections 125 on the rod 113, the rod 113 has small a radial dimension, and thus the support disc 111 could also be designed to have a small radial dimension. Therefore, it is possible to reduce the mounting space required to mount the fastener 11 on a vehicle body.

When the fastener 11 is in the pre-assembling position relative to the fastening attachment 15, the fastening attachment 15 is securely clamped in the pre-assembling clamping space 131 of the fastener 11, so that the fastener 11 and the fastening attachment 15 are securely connected and are less likely to be separated from each other because of a force generated due to vibrations, etc. during storage and transportation.

The positions of the fastener 11 and the fastening attachment 15 in a height direction (insertion direction) remain unchanged from the state when the fastener 11 reaches the pre-assembling position relative to the fastening attachment 15 to form the fastener connecting assembly 10, to the state when the fastener connecting assembly 10 is inserted into the carrier 20 and fastened to the carrier 20. To switch the fastener 11 from the pre-assembling position to the fastening position, it is only needed to rotate the fastener 11 relative to the fastening attachment 15 to change the relative positions of the fastener 11 and the fastening attachment 15 in a radial direction. Therefore, the designs of the fastener 11 and the fastening attachment 15 of the present disclosure enable to connect the fastening attachment 15 and the carrier 20 more conveniently.

After the fastener connecting assembly 10 is fastened to the carrier 20, the fastener connecting assembly 10 will not be separated from the carrier 20 because of the force generated by vibrations, etc. in the running process of the vehicle. Therefore, the fastening attachment 15 and the carrier 20 can be connected securely.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Furthermore, the technical effects and/or technical problems described in this description are exemplary rather than limiting; therefore, the disclosure in this description may be used to solve other technical problems and have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents.

The invention claimed is:

1. A fastener connecting assembly to be fastened to a carrier, wherein the fastener connecting assembly comprises:

a fastener and a fastening attachment, wherein the fastener has a pre-assembling position and a fastening position relative to the fastening attachment, and the fastener is rotatable relative to the fastening attachment between the pre-assembling position in which the fastener is connected to the fastening attachment to form the fastener connecting assembly, and the fastening position in which the fastener connecting assembly is fastened to the carrier;

wherein the fastener comprises:

a support disc having a support disc supporting surface at a lower side; and an engaging mechanism for connecting the fastening attachment, the engaging mechanism extending from the support disc supporting surface, and the engaging mechanism comprising:

a rod connected to the support disc supporting surface at a proximal end, wherein a pair of windows extend through the rod;

a head having a substantially rectangular cross section disposed at a distal end of the rod, wherein a dimension of the rod in a direction parallel to a length direction of the head is smaller than that of the head in the length direction;

a pair of deflectable support members disposed on the rod and comprising support member supporting surfaces facing the support disc, and a pre-assembling clamping space being defined between the support member supporting surfaces and the support disc, wherein the pair of deflectable support members are configured to deflect into corresponding ones of the pair of windows; and a pair of limiting projections disposed on the rod respectively located between the support member supporting surfaces of the pair of deflectable support members and the support disc supporting surface in a height direction of the rod, and the limiting projections of the pair of limiting projections being respectively located above a short wall of a pair of short walls of the head to be offset from the pair of deflectable support members in a rotation direction of the fastener; and the fastening attachment comprises:

a fastening attachment opening, the fastening attachment opening being substantially a cuboid, and the fastening attachment opening being sized to allow the head to be inserted through the fastening attachment opening to enable the fastening attachment opening to surround at least a portion of the rod; and a pair of fastening limiting grooves in communication with the fastening attachment opening, wherein the fastening limiting grooves of the pair of fastening limiting grooves at least partially receive the limiting projections of the pair of limiting projections when the fastener is in the fastening position, wherein the fastening limiting grooves comprise recesses from the fastening attachment opening, wherein at least a portion of a thickness of the fastening attachment is clamped in the pre-assembling clamping space when the fastener is in the pre-assembling position, and the fastening attachment opening is configured to provide a rotation space for the rod so as to allow the fastener to be rotated between the pre-assembling position and the fastening position.

2. The fastener connecting assembly according to claim 1, wherein the deflectable support members of the pair of deflectable support members are respectively located above a long wall of a pair of long walls of the head, and the support member supporting surfaces of the pair of deflectable support members respectively extend outwardly beyond the long walls of a pair of long walls of the fastening attachment opening in a direction parallel to a width of the fastening attachment opening when the fastener is in the pre-assembling position.

3. The fastener connecting assembly according to claim 2, wherein the pair of deflectable support members further comprises:

connecting ends disposed opposite to the support member supporting surfaces, and the pair of deflectable support members being connected to the rod at the connecting ends, wherein the pair of deflectable support members overhang toward the support disc from the connecting ends to the support member supporting surfaces to enable the pair of deflectable support members to be deflectable about the connecting ends toward or away from the rod; and outer walls extending obliquely outwardly from the connecting ends to the support member supporting surfaces with respect to the rod.

4. The fastener connecting assembly according to claim 3, wherein the fastening attachment further comprises:

an outer frame having a first engagement surface and a second engagement surface that are opposite to each other, the first engagement surface and the second engagement surface being respectively configured to be engaged with the carrier and the support disc, and the fastening attachment opening running through the first engagement surface and the second engagement surface;

a pair of pre-assembling limiting grooves disposed on the first engagement surface with each pre-assembling limiting groove respectively disposed at one long wall of the pair of long walls of the fastening attachment opening, and the pair of pre-assembling limiting grooves being in communication with the fastening attachment opening, wherein the pre-assembling limiting grooves of the pair of pre-assembling limiting grooves at least partially respectively receive the deflectable support members of the pair of deflectable support members when the fastener is in the pre-assembling position; and a pair of first rotation guiding grooves disposed on the first engagement surface with each first rotation guiding groove respectively being in communication with one pre-assembling limiting groove of the pair of pre-assembling limiting grooves and with the fastening attachment opening to enable the deflectable support members of the pair of deflectable support members to respectively rotate out of the pair of pre-assembling limiting grooves through the pair of first rotation guiding grooves when the fastener is rotated from the pre-assembling position to the fastening position.

5. The fastener connecting assembly according to claim 4, wherein the pre-assembling limiting grooves of the pair of pre-assembling limiting grooves are respectively provided with pre-assembling limiting walls to respectively restrict the pair of deflectable support members from leaving the pair of pre-assembling limiting grooves.

6. The fastener connecting assembly according to claim 1, wherein a shoulder is formed at a connection position of the rod and the support disc supporting surface, and the shoulder, the support disc supporting surface and the support member supporting surfaces define the pre-assembling clamping space.

7. The fastener connecting assembly according to claim 1, wherein the pair of deflectable support members are at least partially located in the pair of windows when the deflectable support members are not deflected.

8. The fastener connecting assembly according to claim 1, wherein the pair of deflectable support members at least partially enter the cavity through the pair of windows when the pair of deflectable support members is deflected due to a force applied toward the rod.

9. The fastener connecting assembly according to claim 1, wherein the fastening attachment further comprises a pair of second rotation guiding grooves in communication with one fastening limiting groove of the pair of fastening limiting grooves and the fastening attachment opening to enable the limiting projections of the pair of limiting projections to respectively rotate into the fastening limiting grooves of the pair of fastening limiting grooves through the pair of second rotation guiding grooves when the fastener is rotated from the pre-assembling position to the fastening position.

10. The fastener connecting assembly according to claim 9, wherein the fastening limiting grooves of the pair of fastening limiting grooves are respectively provided with fastening limiting walls to restrict the fastener from excessively rotating beyond the fastening position from the pre-assembling position; and the bottoms of the pair of second rotation guiding grooves are higher than the bottoms of the pair of fastening limiting grooves to restrict the reverse rotation of the fastener from the fastening position to the pre-assembling position.

11. A fastener connecting assembly to be fastened to a carrier, wherein the fastener connecting assembly comprises: a fastener and a fastening attachment, wherein the fastener has a pre-assembling position and a fastening position relative to the fastening attachment, and the fastener is rotatable relative to the fastening attachment between the pre- assembling position in which the fastener is connected to the fastening attachment to form the fastener connecting assembly, and the fastening position in which the fastener connecting assembly is fastened to the carrier;

wherein the fastener comprises:

a support disc having a support disc supporting surface at a lower side; and an engaging mechanism for connecting the fastening attachment, the engaging mechanism extending from the support disc supporting surface, and the engaging mechanism comprising:

a rod connected to the support disc supporting surface at a proximal end;

a head having a substantially rectangular cross section disposed at a distal end of the rod, wherein a dimension of the rod in a direction parallel to a length direction of the head is smaller than that of the head in the length direction; and a pair of deflectable support members disposed on the rod and comprising support member supporting surfaces facing the support disc, and a pre-assembling clamping space being defined between the support member supporting surfaces and the support disc, wherein the pair of deflectable support members comprises:

connecting ends disposed opposite to the support member supporting surfaces, and the pair of deflectable support members being connected to the rod at the connecting ends, wherein the pair of deflectable support members overhang toward the support disc from the connecting ends to the support member supporting surfaces to enable the pair of deflectable support members to be deflectable about the connecting ends toward or away from the rod; and outer walls extending obliquely outwardly from the connecting ends to the support member supporting surfaces with respect to the rod wherein the deflectable support members of the pair of deflectable support members are respectively located above a long wall of a pair of long walls of the head, and the support member supporting surfaces of the pair of deflectable support members respectively extend outwardly beyond the long walls of a pair of long walls of the fastening attachment opening in a direction parallel to a width of the fastening attachment opening when the fastener is in the pre-assembling position; and a pair of limiting projections disposed on the rod respectively located between the support member supporting surfaces of the pair of deflectable support members and the support disc supporting surface in a height direction of the rod, and the limiting projections of the pair of limiting projections being respectively located above a short wall of a pair of short walls of the head to be offset from the pair of deflectable support members in a rotation direction of the fastener; and wherein the fastening attachment comprises:

a fastening attachment opening, the fastening attachment opening being substantially a cuboid, and the fastening attachment opening being sized to allow the head to be inserted through the fastening attachment opening to enable the fastening attachment opening to surround at least a portion of the rod;

an outer frame having a first engagement surface and a second engagement surface that are opposite to each other, the first engagement surface and the second engagement surface being respectively configured to be engaged with the carrier and the support disc, and the fastening attachment opening running through the first engagement surface and the second engagement surface;

a pair of pre-assembling limiting grooves disposed on the first engagement surface with each pre-assembling limiting groove respectively disposed at one long wall of the pair of long walls of the fastening attachment opening, and the pair of pre-assembling limiting grooves being in communication with the fastening attachment opening, wherein the pre-assembling limiting grooves of the pair of pre-assembling limiting grooves at least partially respectively receive the deflectable support members of the pair of deflectable support members when the fastener is in the pre-assembling position; and a pair of first rotation guiding grooves disposed on the first engagement surface with each first rotation guiding groove respectively being in communication with one pre-assembling limiting groove of the pair of pre-assembling limiting grooves and with the fastening attachment opening to enable the deflectable support members of the pair of deflectable support members to respectively rotate out of the pair of pre-assembling limiting grooves through the pair of first rotation guiding grooves when the fastener is rotated from the pre-assembling position to the fastening position; and a pair of fastening limiting grooves disposed on the second engagement surface with each fastening limiting groove disposed at one long wall of the pair of long walls of the fastening attachment opening, and the pair of fastening limiting grooves being in communication with the fastening attachment opening, wherein the fastening limiting grooves of the pair of fastening limiting grooves respectively at least partially receive the limiting projections of the pair of limiting projections when the fastener is in the fastening position; and a pair of second rotation guiding grooves disposed on the second engagement surface and each second rotation guiding groove respectively in communication with one fastening limiting groove of the pair of fastening limiting grooves and the fastening attachment opening to enable the limiting projections of the pair of limiting projections to respectively rotate into the fastening limiting grooves of the pair of fastening limiting grooves through the pair of second rotation guiding grooves when the fastener is rotated from the pre-assembling position to the fastening position, wherein at least a portion of a thickness of the fastening attachment is clamped in the pre-assembling clamping space when the fastener is in the pre-assembling position, and the fastening attachment opening is configured to provide a rotation space for the rod so as to allow the fastener to be rotated between the pre- assembling position and the fastening position.

12. The fastener connecting assembly according to claim 11, wherein the fastening limiting grooves of the pair of fastening limiting grooves are respectively provided with fastening limiting walls to restrict the fastener from excessively rotating beyond the fastening position from the pre-assembling position; and the bottoms of the pair of second rotation guiding grooves are higher than the bottoms of the pair of fastening limiting grooves to restrict the reverse rotation of the fastener from the fastening position to the pre-assembling position.

13. A fastener connecting assembly configured to be attached to a carrier, the fastener connecting assembly comprising:

a fastener; and a fastening attachment, wherein the fastener is rotatable relative to the fastening attachment between a pre-assembling position, in which the fastener is connected to the fastening attachment to form the fastener connecting assembly, and a fastening position, in which the fastener connecting assembly is fastened to the carrier, the fastener comprising a support disc having a lower support surface and an engaging mechanism extending from the support disc lower support surface, the engaging mechanism comprising a rod connected at a proximal end to the support disc, a head disposed at a distal end of the rod and having a length greater than a dimension of the rod in a parallel direction, a pair of deflectable support members connected to the rod at connecting ends and extending toward the support disc to define a pre-assembling clamping space between the support members and the support disc, the support members being deflectable about the connecting ends with outer walls extending obliquely outward from the connecting ends to support surfaces, the support surfaces extending outward beyond corresponding walls of a fastening attachment opening in the pre-assembling position, and a pair of limiting projections on the rod between the support members and the support disc, offset from the support members in a rotation direction of the fastener; and wherein the fastening attachment comprises the fastening attachment opening configured to receive the head and at least a portion of the rod, an outer frame having first and second engagement surfaces with the fastening attachment opening extending through the engagement surfaces, a pair of pre-assembling limiting grooves on the first engagement surface configured to receive the deflectable support members in the pre-assembling position, a pair of first rotation guiding grooves in communication with the pre-assembling limiting grooves and the fastening attachment opening, configured to guide the support members out of the pre-assembling limiting grooves when the fastener rotates to the fastening position, a pair of fastening limiting grooves on the second engagement surface configured to receive the limiting projections in the fastening position, and a pair of second rotation guiding grooves in communication with the fastening limiting grooves and the fastening attachment opening, configured to guide the limiting projections into the fastening limiting grooves when the fastener rotates to the fastening position, wherein at least a portion of a thickness of the fastening attachment is clamped in the pre-assembling clamping space in the pre-assembling position, and the fastening attachment opening provides rotation space for the rod to allow rotation of the fastener between the pre-assembling position and the fastening position.

14. The fastener connecting assembly of claim 13, wherein the pre-assembling limiting grooves include limiting walls configured to restrict the deflectable support members from leaving the pre-assembling limiting grooves.

15. The fastener connecting assembly of claim 13, wherein the fastening limiting grooves include limiting walls configured to restrict excessive rotation of the fastener beyond the fastening position.

16. The fastener connecting assembly of claim 15, wherein bottoms of the second rotation guiding grooves are higher than bottoms of the fastening limiting grooves to restrict reverse rotation of the fastener from the fastening position to the pre-assembling position.

17. The fastener connecting assembly of claim 13, wherein the support members are positioned above long walls of the head, and the limiting projections are positioned above short walls of the head, offset from the support members in a rotational direction of the fastener.

18. The fastener connecting assembly of claim 13, wherein the pre-assembling clamping space receives at least a portion of a thickness of the fastening attachment when the fastener is in the pre-assembling position.

* * * * *